Sept. 17, 1940.  G. G. GOING  2,215,099

ELECTRIC DRY SHAVER

Filed Feb. 10, 1938

INVENTOR
GEORGE G. GOING

BY *W. C. Sparks*
ATTORNEY

Patented Sept. 17, 1940

2,215,099

UNITED STATES PATENT OFFICE 2,215,099

ELECTRIC DRY SHAVER

George G. Going, Stamford, Conn., assignor, by mesne assignments, to Remington Rand Inc., Buffalo, N. Y., a corporation of Delaware Application February 10, 1938, Serial No. 189,732

4 Claims. (Cl. 30—43)

This invention relates to improvements in electric dry shavers and, more particularly, to the shearing members thereof.

The device embodying my invention is substantially in the form and shape of that disclosed by R. E. Benner in his pending application for a patent, filed December 7, 1937, and bearing Serial No. 178,464. The important modifications covered by this application are the longitudinal webs dividing the cutting elements on each side of the groove on the top of each shearing member and the form and arrangement of the cutting elements.

An essential object of my invention is to provide means for giving greater strength and durability to the shearing members while at the same time effecting a close clean shave.

A further object of my invention is to provide means for adequately trimming a man's mustache as well as his side-burns.

Other advantages of my invention will be made apparent in a detailed and complete description thereof to follow.

The novelty embodied in my invention resides substantially in the combination, construction, arrangement, and relative position of the respective parts, all of which will be more fully described in the following specification in connection with the drawing accompanying it, in which.

Like characters of references refer to like parts in all the figures of the drawing.

Figure 1:
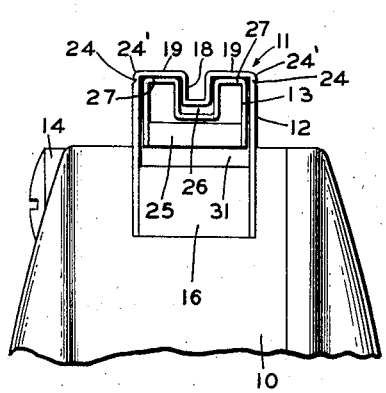
Fig. 1 is an end elevational view of the upper casing and shearing head of the device embodying my invention.
Figure 2:
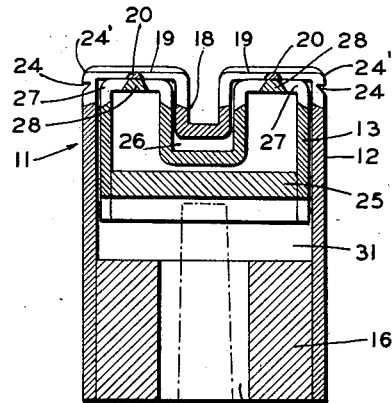
Fig. 2 is a section of same taken substantially along line 2—2 of Fig. 3.
Figure 3:
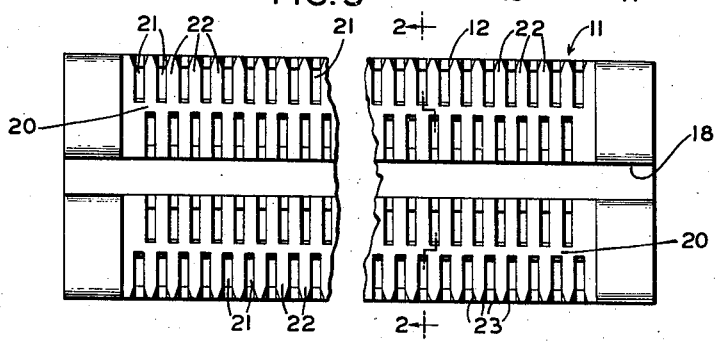
Fig. 3 is a top view of the outer shearing member with a part thereof broken away.
Figure 4:
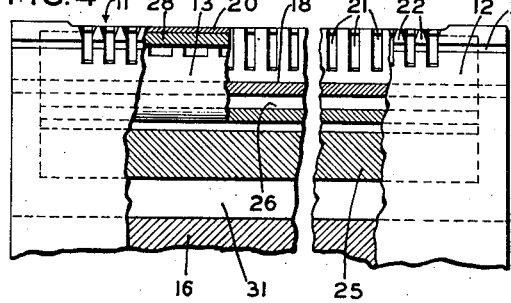
Fig. 4 is a side elevational view partially broken away to show parts of the outer and inner shearing members.
Figure 5:
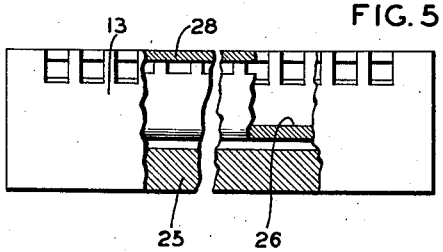
Fig. 5 is a side elevational view of the inner shearing member having the side walls broken away to show the inner portion thereof.
Figure 6:
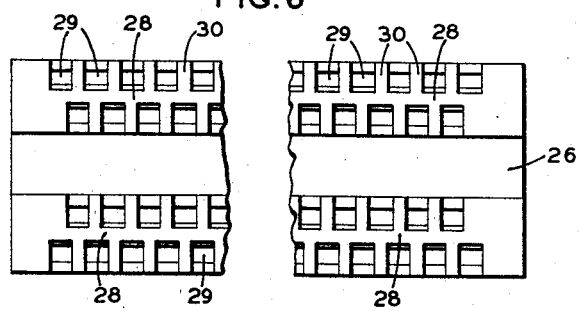
Fig. 6 is a top view of the inner shearing member with a portion thereof broken away.

Removably secured to a motor casing 10 (Fig. 1) is a shearing head 11 comprising a stationary outer shearing member 12 and an inner shearing member 13 reciprocally mounted therein. Shearing head 11 is secured to motor casing 10 by set screw 14. Engaging inner shearing member 13 is a rock lever 15 which is actuated by the motor in a well known manner so as to provide means for reciprocally moving inner shearing member 13 within outer shearing member 12.

Outer shearing member 12 has a base 16 and an aperture 17 therein through which rock lever 15 extends. It also has openings (not shown) for well known resilient plungers to extend through. Positioned midway on the top portion of outer member 12 and extending longitudinally thereof, is groove 18. On each side of groove 18 are similarly formed cutter portions 19, each having a centrally located web 20 extending across the top thereof. On each side of web 20 in each of the cutter portions 19 a plurality of slots 21 are cut to form transverse cutter bars 22. The cutter bars on one side of web 20 in each of the cutter portions 19 are staggered in relation to those on the opposite side thereof. All said cutter bars 22 extend down along the walls of cutter portions 19, but only those cutter bars on the outer side of web 20 have pointed tips 23. The outer walls of cutter portions 19 are formed with V-shaped grooves 24 to provide combing edges 24'.

Inner shearing member 13 is formed in a shape substantially that of outer shearing member 12 having a base 25, groove 26, cutter portions 27, webs 28 on each cutter portion extending longitudinally in the center thereof, slots 29 forming transverse cutter bars 30 which are in wider spaced relationship than cutter bars 22 of the outer cutter. Cutter bars 30 are staggered in the same manner as cutter bars 22 of outer shearing member 12 but do not have pointed tips. However, the top of cutter bars 30 is so ground away as to give the cutter bars sharp cutting edges. The base 25 is provided with notches to receive rock lever 15 and resilient plungers (not shown). Said plungers urge inner shearing member 13 against the rear walls of outer shearing member 12, bringing the two shearing members in close coactive engagement and leaving a chamber 31 to receive and retain the hair clippings.

It is apparent that the webs 20 and 28 form a reinforcement for the cutter bars, thereby permitting them to be ground to a close minimum thickness without weakening the structure, thus forming a cutting head which will effect a close smooth shave. The staggered relation of the cutter bars permit a wider sweep of hair surface to be covered in one travel of the cutters. The pointed tips of the outer cutter bars effectively comb the irregular hairs of a man's mustache or side-burns and bring them into shearing contact with the cutting edges of the inner cutter bars.

While I have described what I consider to be a highly desirable embodiment of my invention it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is:

1. In a dry shaver, the combination of a shearing head comprising a fixed outer cutter and a reciprocating inner cutter, cutting members on each of said cutters intercepted by a longitudinal groove and having a longitudinal web on their respective top surfaces, transverse cutter bars disposed on both sides of each of said webs, the cutter bars on one side of the same web being in staggered relationship to those of the other side, the cutter bars of the outer cutter having their outer ends pointed, and means for reciprocating said inner cutter.

2. In a dry shaver, the combination of a shearing head comprising a fixed outer cutter and a reciprocating inner cutter, cutting members on each of said cutters intercepted midway thereof by a longitudinal groove and having a longitudinal web on their respective top surfaces, transverse cutter bars disposed on both sides of each of said webs, the cutter bars on one side of the same web being in staggered relationship to those of the other side, the cutter bars of the outer cutter having their outer ends pointed, and means for reciprocating said inner cutter.

3. In a dry shaver, the combination of a shearing head comprising a fixed outer cutter and a reciprocating inner cutter, cutting members on each of said cutters intercepted midway thereof by a longitudinal groove and having a longitudinal web on their respective top surfaces, transverse cutter bars disposed on both sides of each of said webs, and extending down the upper walls of said cutting members, the cutter bars on one side of the same web being in staggered relationship to those of the other side, the cutter bars of the outer cutter having their outer ends pointed, and means for reciprocating said inner cutter.

4. In a dry shaver, the combination of a shearing head comprising a fixed outer cutter and a reciprocating inner cutter, cutter members on each of said cutters intercepted midway thereof by a longitudinal groove, said groove being formed by four right angle bends, longitudinal webs on said cutters equidistant from said grooves, transverse cutter bars staggered on each side of said webs and extending down the upper walls of said cutters, the cutter bars on the top surface of the outer cutter having pointed ends, and combing edges formed beneath the pointed ends of the outer cutter bars.

GEORGE G. GOING.